Patented July 20, 1948

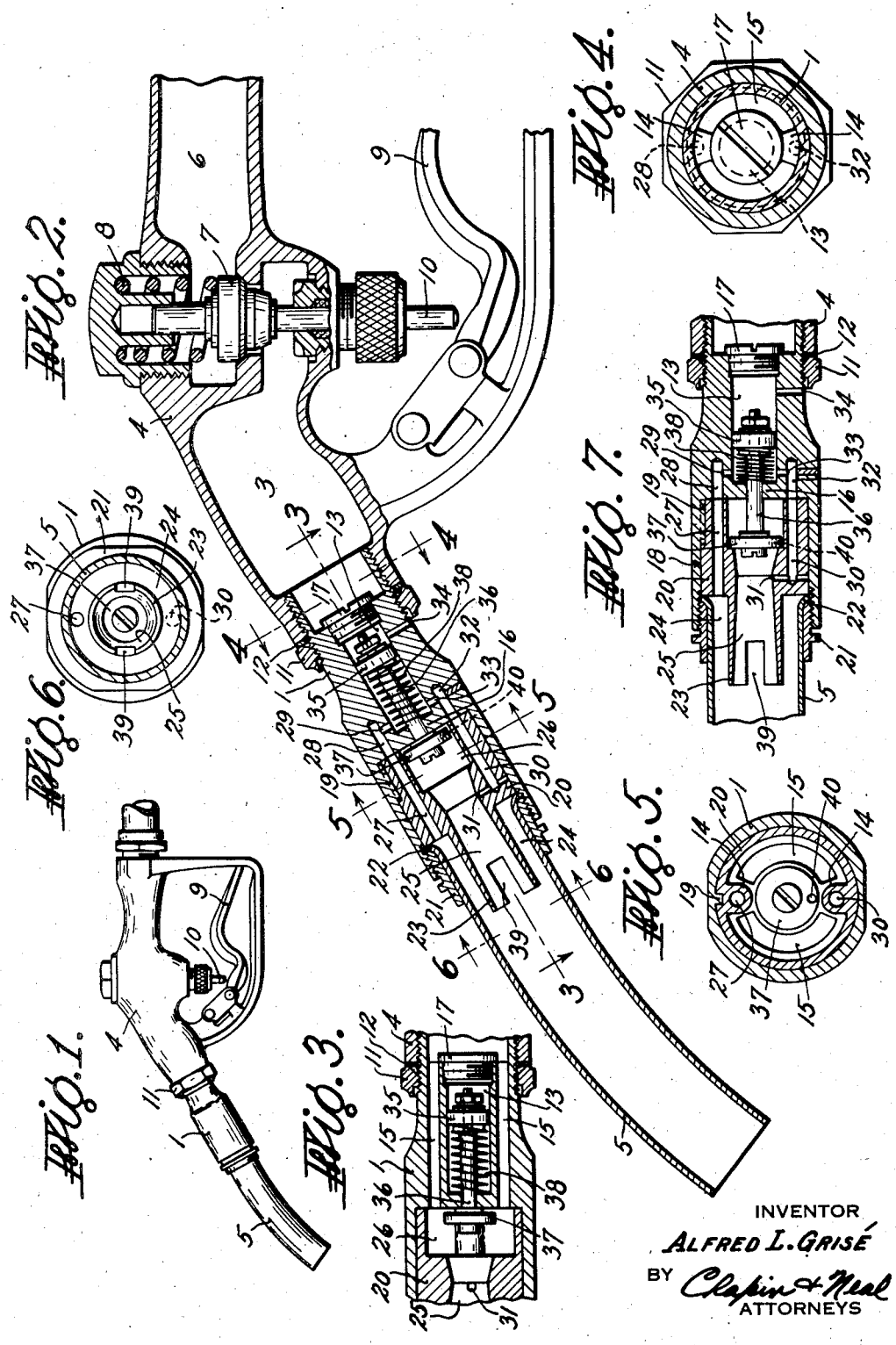

2,445,524

UNITED STATES PATENT OFFICE 2,445,524

AUTOMATIC SHUT-OFF VALVE FOR HOSE NOZZLES

Alfred L. Grisé, Springfield, Mass., assignor to Gilbert & Barker Manufacturing Company, West Springfield, Mass., a corporation of Massachusetts Application August 22, 1946, Serial No. 692,212

2 Claims. (Cl. 226—127)

1

This invention relates to an improved automatic shut-off valve for hose nozzles.

The invention has to do with an automatic shut-off valve, which is actuated to closed position by suction, caused by flow of the dispensed liquid through a venturi and produced in the cylinder or other chamber of a pneumatic valve-actuating means, and in which such means is prevented from operating to close the valve by a vent, extending from said cylinder to the delivery end of the spout of the nozzle, whereby when the liquid in the tank being serviced rises sufficiently, the vent will be closed and the valve-actuating pneumatic means will be rendered operative to actuate the valve to closed position.

Heretofore, it has been customary to provide in the delivery spout of the nozzle a vent tube, which extends from the outlet end of the spout through the latter for connection with another vent passage leading to the cylinder or other chamber of the pneumatic, valve-actuating means.

This invention has for its object the provision in a device of the type described of a nozzle for shaping the stream of liquid, which is discharged from the venturi into the spout, so that the stream is flattened down and at certain locations is spaced from the inner peripheral wall of the spout so as to leave an air passage, which extends from the delivery end of the spout through the latter to the vent passage leading to the cylinder of the pneumatic valve-actuating means.

The invention will be disclosed with reference to the accompanying drawing in which:

Fig. 1 is a small-scale, exterior elevational view showing the automatic shut-off valve applied to a valved hose nozzle;

Fig. 2 is a sectional elevational view thereof, drawn to a larger scale and showing the automatic shut-off valve in open position;

Fig. 3 is a fragmentary sectional view taken on the line 3—3 of Fig. 2;

Figs. 4, 5 and 6 are cross sectional views taken on the lines 4—4, 5—5 and 6—6, respectively of Fig. 2; and Fig. 7 is a fragmentary sectional view taken similarly to Fig. 2 but showing the automatic shut-off valve in closed position.

Referring to these drawings; the automatic shut-off valve includes a casing (Fig. 2) having an outer section 1, the inlet end of which is adapted, as by the screw threads 2, for connection to the outlet 3 of the body 4 of a hose nozzle and the outlet end of which has a spout 5 through which the liquid is delivered. The hose nozzle may be

2 such as is customarily used with gasoline measuring and dispensing apparatus and has an inlet 6 adapted for connection to the hose of such apparatus, a valve 7 for controlling communication between inlet 6 and outlet 3, a spring 8 tending to hold valve 7 closed, and a handle 9 for manually opening valve 7 by inward pressure on the valve stem 10. Nozzles of this kind usually have a spout fastened directly to outlet 3. To adapt such nozzles for this invention the usual spout is removed and casing 1 is screwed into the interiorly threaded end of outlet 3 and held thereto by the usual lock nut 11 and the joint sealed by the packing 12. A new spout 5, with special provisions to be described, is provided on the casing 1. Existing hose nozzles can thus be converted into nozzles with the automatic shut-off valve, by simply removing the old spout from each nozzle and substituting the casing 1 and spout 5 of this invention.

The section 1 is of generally cylindrical form. It has within it the pneumatic or suction-operated means for closing the shut-off valve. Such means, as herein shown, consists of a cylinder 13, which is located in and coaxially of the section and extends longitudinally from the inlet end to about the mid-point of the casing. The wall of this cylinder is supported by diametrically opposed webs 14 (Figs. 4 and 5) from the interior wall of the casing, leaving two passages 15 for the passage of liquid past the cylinder. This cylinder has an integral head 16 (Fig. 2) at one end and at the other end a removable head in the form of a screw 17, threaded into the cylinder. The casing 1 at its other end is formed with a recess or socket 18, which is cylindrical, except for a short inwardly projecting key 19 (see also Fig. 5), and the base of the socket is a plane surface at right angles to the axis thereof and in this plane lies the outer face of cylinder head 16. This socket 18 receives an inner casing section 20 which has an outer cylindrical surface and a square inner end face to abut the base of the socket 18 and a keyway to receive key 19. The outer end of the recess is screw threaded to receive an annular nut 21, which surrounds the inlet end of spout 5 and the inner end of which presses against the out-turned flange 22 of the spout, forcing the same inwardly and pressing the member 20 against the base wall of socket 18. The one nut thus serves to hold together the spout 5 and the two sections 1 and 20 of the casing.

The member 20 is provided with a forwardly-projecting cylindrical nozzle 23 of smaller diameter, forming an annular space 24 between it and the interior wall of spout 5. The member 20 further is provided with a coaxial Venturi passage 25, extending from the front face of nozzle 23, through the latter and into the body of the member, communicating at its rear end with a coaxial chamber 26 of larger diameter which extends to the rear end face of member 20 and into which the arcuate passages 15 open, as shown in Figs. 3 and 5, for delivery of liquid to the venturi. There is a vent passage 27 which extends entirely through member 20 parallel to the axis thereof and which opens at one end to the annular space 24 and at the other end communicates with a passage 28 which in turn extends part way into one of the webs 14 and is connected by a radial passage 29 to the interior of cylinder 13 near the head 16. Parallel with and located diametrically of the vent passage 27 is a passage 30, which extends from the rear end of member 20 forwardly toward, but not quite to, the front face of the member and which communicates by means of a radial passage 31 with the throat of the venturi 25. The rear end of passage 30 communicates with a passage 32 which extends part way into the other web 14 and has its inner end connected by a radial passage 33 to the interior of cylinder 13 near the head 16. Extending radially through the last-named web is a vent hole 34 which interconnects the rear end of cylinder 13 (near head 17) with the atmosphere.

Within the cylinder 13 is a piston 35, the piston rod 36 of which passes through the head 16 and has fixed to its outer end a valve 37, located within the chamber 26. A spring 38, located within cylinder 13 and surrounding rod 36, acts between head 16 and the adjacent face of the piston 35 with a tendency to hold the latter and valve 37 in the open position shown in Fig. 2. The valve is moved to the closed position shown in Fig. 7, in which it closes the entrance of the venturi, by means of the suction effect created in the cylinder 13 by the rush of liquid through the venturi. A partial vacuum is created in the cylinder to the left of piston 13 by suction through the passages 33, 32, and 31, whereby atmospheric pressure in the cylinder to the right of the piston forces the latter to the left until the valve engages its seat on member 20. While suction is applied to cylinder 13 continuously while liquid flows through the venturi, it is prevented from closing valve 37 because of the vent provided by the passages 27, 28 and 29, the annular space 24, and an air space which extends through spout 5 and is formed as hereinafter described.

The nozzle 23 has slots 39 (Figs. 2 and 6) extending at diametrically opposite locations from its outlet end part way inwardly (Fig. 2). These slots enable some of the liquid to discharge through them into the spout and thus broaden out the stream of liquid discharging into the spout so that the stream has a flattened down, or approximately elliptical, cross sectional shape rather than circular as would be the case if the nozzle was not slotted. The stream will touch the walls of the nozzle along two opposite sides but it will be initially spaced from the top and bottom thereof. Where the stream is turned by the bend in the spout 5, the stream will strike the spout at the top but along the bottom there will be left an air space, which is continuous from the delivery end of the spout to the annular space 24. Thus, air can pass up this air space in the spout to said space 24 and through the venting passages 27, 28 and 29 to cylinder 13 and prevent the piston from being operated to close the valve. However, when the liquid in the fill pipe of the tank being serviced rises sufficiently to submerge the delivery end of spout 5, the venting means for cylinder 13 will be closed and a partial vacuum will then be created in the cylinder by the suction produced by flow of liquid through the venturi and the piston will be actuated to move valve 37 to closed position and stop the flow of liquid. The closing of the valve will be manifested to the operator by a slight clicking noise whereupon he will close the valve 7 in the hose nozzle body 4 and withdraw spout 5 from the fill pipe. Cylinder 13 will then be vented to the atmosphere on both sides of the piston so that spring 38 will open valve 37. A small bleed hole 40 through valve 37 serves to relieve the pressure of the liquid which is trapped between the hand valve 7 and the automatic valve 37 and enables a quick opening of the latter valve.

I claim:
1. An automatic shut-off valve for hose nozzles, comprising, a casing having extending therethrough a liquid-conducting conduit the inlet end of which is adapted for connection to the outlet end of the hose nozzle, a delivery spout connected to the outlet end of said conduit, said casing having a nozzle extending into the spout and spaced from the wall of the spout to form an annular space, said conduit including a venturi discharging through said nozzle into the spout, a valve to control the flow through said conduit, resilient means tending to hold the valve in position to allow flow through said conduit, suction-operated means for moving said valve into position to stop such flow, a suction conduit extending from the throat of the venturi to said means for actuating the latter, and a vent conduit extending from said means to said annular space, said nozzle having slots in its wall at opposite locations to enable some of the liquid to discharge from the venturi through the sides of the nozzle before reaching the outer end of the latter, whereby to produce in the spout a flattened down stream of liquid spaced from its wall enough to leave a continuous air space extending from the delivery end of the spout to said annular space for the purpose of venting said means and rendering it ineffective to close said valve until the delivery end of said spout becomes submerged in liquid.

2. An automatic shut-off valve for hose nozzles, comprising, a casing having one end adapted for connection to the outlet end of the casing of a hose nozzle, a tubular delivery spout of circular cross sectional shape secured to the other end of said casing, said casing having extending therethrough a conduit for conducting liquid from the hose nozzle casing to said spout, said conduit including between its inlet and outlet ends a venturi and having at its outlet end a flat-stream-forming nozzle extending into said spout and having its exterior wall spaced from the interior wall of the spout forming an intervening space, a valve to control the flow through said conduit, resilient means tending to hold the valve in position to allow flow through said conduit, suction-operated means for moving said valve into position to stop such flow, a suction conduit extending from the throat of the venturi to said means for actuating the latter, and a vent conduit extending from said means to said space, said nozzle discharging the liquid in a flat stream spaced from the spout enough to leave a continuous air space extending from the delivery end of the spout to said intervening space around the nozzle for the purpose of venting said means and thereby rendering it ineffective to close said valve until the delivery end of said spout becomes submerged in liquid.

ALFRED L. GRISÉ.

REFERENCES CITED

The following references are of record in the file of this patent:

UNITED STATES PATENTS

| Number | Name | Date |
| --- | --- | --- |
| 2,330,704 | Grise | Sept. 28, 1943 |
| 2,111,851 | Flinchbaugh | Mar. 22, 1938 |